United States Patent
Bai

(10) Patent No.: US 8,520,773 B2
(45) Date of Patent: Aug. 27, 2013

(54) POWER AMPLIFIER DIGITAL PREDISTORTION SYSTEM FOR CONCURRENT DUAL BAND INPUTS

(75) Inventor: Chunlong Bai, Kanata (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 100 days.

(21) Appl. No.: 13/364,019

(22) Filed: Feb. 1, 2012

(65) Prior Publication Data
US 2013/0195220 A1 Aug. 1, 2013

(51) Int. Cl.
*H04L 25/03* (2006.01)
*H04L 25/49* (2006.01)
*H04K 1/02* (2006.01)

(52) U.S. Cl.
USPC ............ 375/297; 375/284; 375/295; 375/296

(58) Field of Classification Search
USPC .................................. 375/295, 297, 284, 296
See application file for complete search history.

(56) References Cited

U.S. PATENT DOCUMENTS

| | | | | |
|---|---|---|---|---|
| 7,539,464 | B2 * | 5/2009 | Suzuki et al. | 455/114.3 |
| 7,551,688 | B2 * | 6/2009 | Matero et al. | 375/297 |
| 2006/0276147 | A1 * | 12/2006 | Suzuki et al. | 455/114.3 |

* cited by examiner

*Primary Examiner* — Ted Wang
(74) *Attorney, Agent, or Firm* — Christopher & Weisberg, P.A.

(57) ABSTRACT

A method and system for pre-distorting dual band signals to compensate for distortion of a non-linear power amplifier in a radio transmitter are disclosed. According to one embodiment, a first signal in a first frequency band and a second signal in a second frequency band are pre-distorted according to first and second pre-distortion function, respectively, the first and second pre-distortion functions being the dual of one another.

20 Claims, 8 Drawing Sheets

POWER AMPLIFIER DIGITAL PREDISTORTION SYSTEM FOR CONCURRENT DUAL BAND INPUTS

FIELD

The present invention relates to radio frequency (RF) transmitters and in particular to a pre-distortion method and system to compensate for non-linearities of a power amplifier in an RF transmitter.

BACKGROUND

A radio system includes a transmitter that transmits information-carrying signals to a receiver. The transmitter includes a power amplifier that operates to amplify the signal to be transmitted to a power level that is sufficient to enable receipt of the signal by the receiver. For the power amplifier to achieve high efficiency in terms of the ratio of peak power to average power, the power amplifier of a transmitter is operated in a non-linear region. This causes distortion of the input signal and broadening of the bandwidth of the input signal. To compensate for the distortion of the signal introduced by the power amplifier, the input signal is first passed through a pre-distorter that pre-distorts the input signal.

A typical pre-distorter is itself non-linear, having a non-linearity that compensates for the non-linearity of the pre-distorter. To illustrate, a power amplifier may exhibit first and third order effects characterized by a polynomial function of the input that may be written for third order non-linearities as:

$$y = f_{NL\text{-}IM3}(x) = a_1 x + a_3 x^3 \qquad \text{(AW-01)}$$

where x is the input signal and $a_3$ is much less than $a_1$. The function f is the response of the power amplifier to the input x and the subscript NL-IM3 denotes non-linearity up to order three. To compensate for the distortion introduced by the power amplifier, a pre-distorter may have a response that is a polynomial function of the input:

$$z = f_{PD\text{-}IM3}(x) = b_1 x + b_3 x^3 \qquad \text{(AW-02)}$$

Substituting equation AW-02 into equation AW-01 leads to:

$$y = f_{NL\text{-}IM3}(f_{PD\text{-}IM3}(x)) = a_1 b_1 x + (a_1 b_3 + a_3 b_1^3) x^3 + O(x^5) \qquad \text{(AW-03)}$$

where $O(x^5)$ are terms of 5th order or higher. By appropriate selection of the coefficients $b_1$ and $b_3$, the third order term may be removed at the expense of creating higher order terms of less significant magnitude. The solution to achieve this is given by:

$$b_3 = -a_3 b_1^3 / a_1 \qquad \text{(AW-04)}$$

Without loss of generality, assume that $a_1 = b_1 = 1$. Then the solution to compensate for third order distortions is:

$$b_3 = -a_3 \qquad \text{(AW-05)}$$

This simple illustration is for third order non-linearities. For higher order non-linearities, the same approach may be taken to cancel the higher order terms. Thus, the pre-distorter is a non-linear device that compensates for the distortion caused by the power amplifier.

The bandwidth of the pre-distorter must be wider than the bandwidth of the input signal depending on the order of inter-modulation to be compensated by the pre-distorter. For example, for third order inter-modulations, the pre-distorted signal occupies about three times the bandwidth of the input signal to the pre-distorter. For fifth order inter-modulations, the pre-distorted signal occupies about 5 times the bandwidth of the input signal. Higher bandwidth implies that the sampling rate of the pre-distorted signal must be higher than the sampling rate of the sampled baseband signal from a modulator to avoid aliasing.

The problem of requiring a high sampling rate due to pre-distortion is exacerbated when the input signal is a dual band signal. Dual band signals are used when multiple wireless communication standards specify transmission using more than one frequency band, or when a single wireless communication standard specifies transmission using more than one frequency band. An up-converted dual band signal has a first continuous band at a first carrier frequency and a second continuous band at a second carrier frequency. The spacing between the carrier frequencies is such that the ratio of the carrier frequency spacing to the maximum individual bandwidth of a first or second band is very high so that a very large sampling rate is needed to avoid aliasing. A very high sampling rate is undesirable since a high clock rate may not be available within the system, and/or is more costly to implement, consumes additional power, etc.

What is needed is a method and system for pre-distorting a dual band signal that does not depend upon a sampling rate that is much higher than the sampling rate of a baseband signal of one of the two bands. More particularly, what is needed is a method and system for determining basis functions for pre-distortion of each band of the dual band signal separately while not requiring a high sampling rate.

SUMMARY

The present invention advantageously provides a method and system for pre-distorting a dual band signal at a relatively low sampling rate. According to one aspect, a first signal $s_1$ having energy substantially in a first band A and a second signal $s_2$, having energy substantially in a second band B are obtained. A combination of the first signal and the second signal are pre-distorted according to a first set of basis functions to produce a first pre-distorted signal. The first set of basis functions are chosen to produce a first combination of powers of the first signal and the second signal. The combination of the first signal and the second signal are also pre-distorted according to a second set of basis functions to produce a second pre-distorted signal. The second set of basis functions are chosen to produce a second combination of powers of the first signal and the second signal.

According to another aspect, the invention provides a pre-distortion system to compensate for the distortion of a power amplifier in a radio. The system includes a first pre-distortion circuit and a second pre-distortion circuit. The first pre-distortion circuit pre-distorts a combination of a first signal $s_1$ and a second signal $s_2$ according to a first set of basis functions. The second pre-distortion circuit pre-distorts the combination of the first signal and the second signal $s_2$ according to a second set of basis functions. The second set of basis functions is a dual of the first set of basis functions, the dual set being obtained by interchanging the roles of the first signal and the second signal.

According to another aspect, the invention provides a method of pre-distorting a dual band signal to compensate for distortion of a power amplifier. The method includes performing a pre-distortion operation on a first signal $s_1$ in a band A at a first time according to a first set of basis functions by a first circuit. The method further includes performing the pre-distortion operation on a second signal $s_2$ in a band B at a second time according to a second set of basis functions by the first circuit, the first set of basis functions being the dual of the second set of basis functions.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
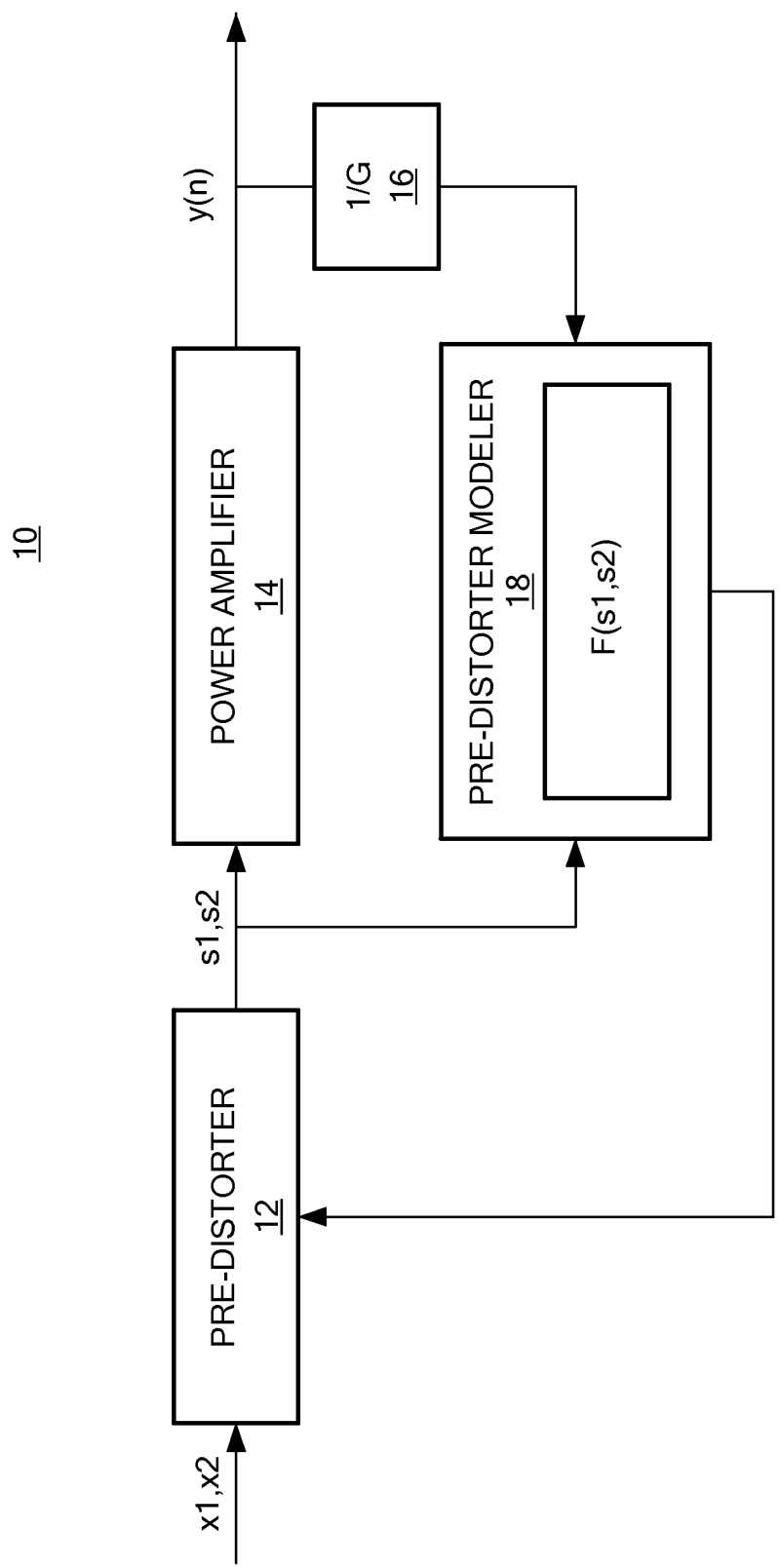
FIG. 1 is an exemplary block diagram of an RF transmitter front end constructed in accordance with principles of the present invention.

Before describing in detail exemplary embodiments that are in accordance with the present invention, it is noted that the embodiments reside primarily in combinations of apparatus components and processing steps related to pre-distortion in a radio of a wireless communication system. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Referring now to the drawing figures, in which like reference designators denote like elements, there is shown in FIG. 1 an exemplary block diagram of a dual band pre-distortion architecture constructed in accordance with the present invention, and generally denoted as system "10". System 10 includes a pre-distorter 12, a power amplifier 14, a multiplier 16, and a pre-distorter modeler 18. The pre-distorter 12 receives a dual band signal including a first signal x1 having signal energy predominantly in a first band A and a second signal x2 having signal energy predominantly in a second band B. In one embodiment, the pre-distorter 12 has two dual-input pre-distorters. In this embodiment, a first dual-input pre-distorter pre-distorts a combination of the first and second signal according to a first set of basis functions and a first set of coefficients from the pre-distorter modeler 18, a second dual-input pre-distorter pre-distorts the combination of the first signal and the second signal according to a second set of basis functions and a second set of coefficients from the pre-distorter modeler 18. In another embodiment, the pre-distorter 12 includes a single one-input pre-distorter that jointly pre-distorts the first and second signals according to two sets of basis functions that are the dual of one another. These different embodiments are described more fully below.

The outputs of the pre-distorter 12 are the pre-distorted signals s1 and s2. The pre-distorted signals are input to the power amplifier 14 and to the pre-distorter modeler 18. The power amplifier 14 amplifies and distorts the pre-distorted inputs. The pre-distorter coefficients and basis functions of the pre-distorter 12 are chosen by the pre-distorter modeler 18 so that the output of the power amplifier 14 is linearly related to the input signals x1 and x2 throughout an entire amplification range of the power amplifier 14. To accomplish this linearity, the pre-distorter modeler 18 receives the pre-distorted signals s1 and s2 and the output of the power amplifier 14 divided by the amplifier gain G by the multiplier 16.

Figure 2:
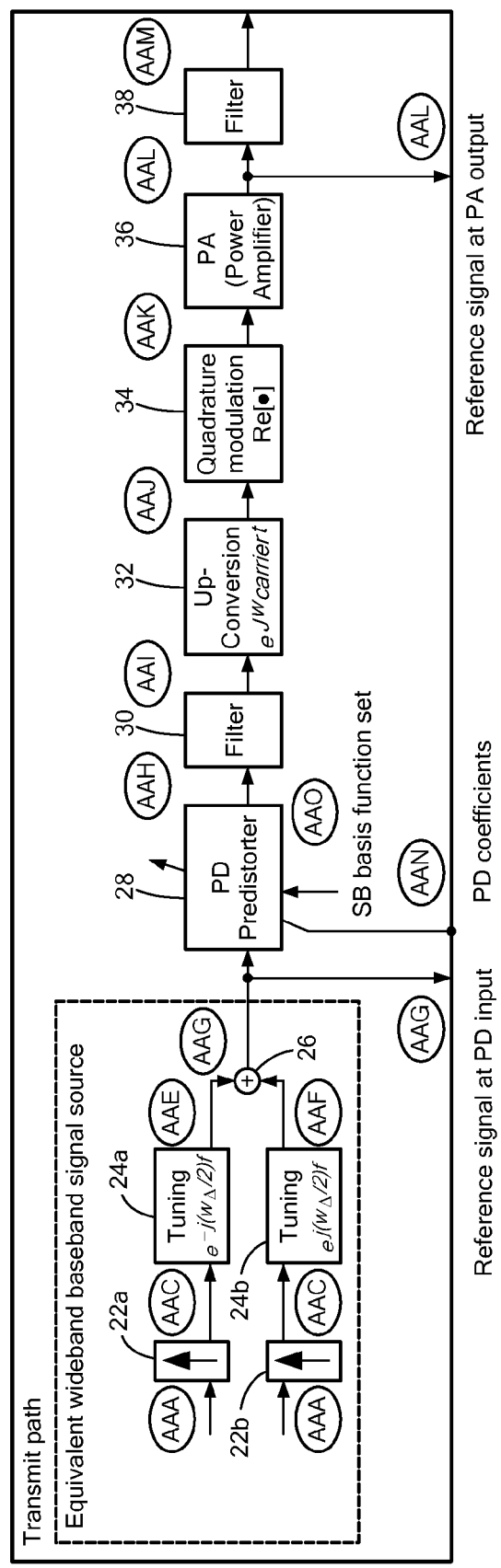
FIG. 2 is an exemplary block diagram of a wideband single band transmitter with a single-band pre-distorter constructed in accordance with principles of the present invention.
Figure 5:
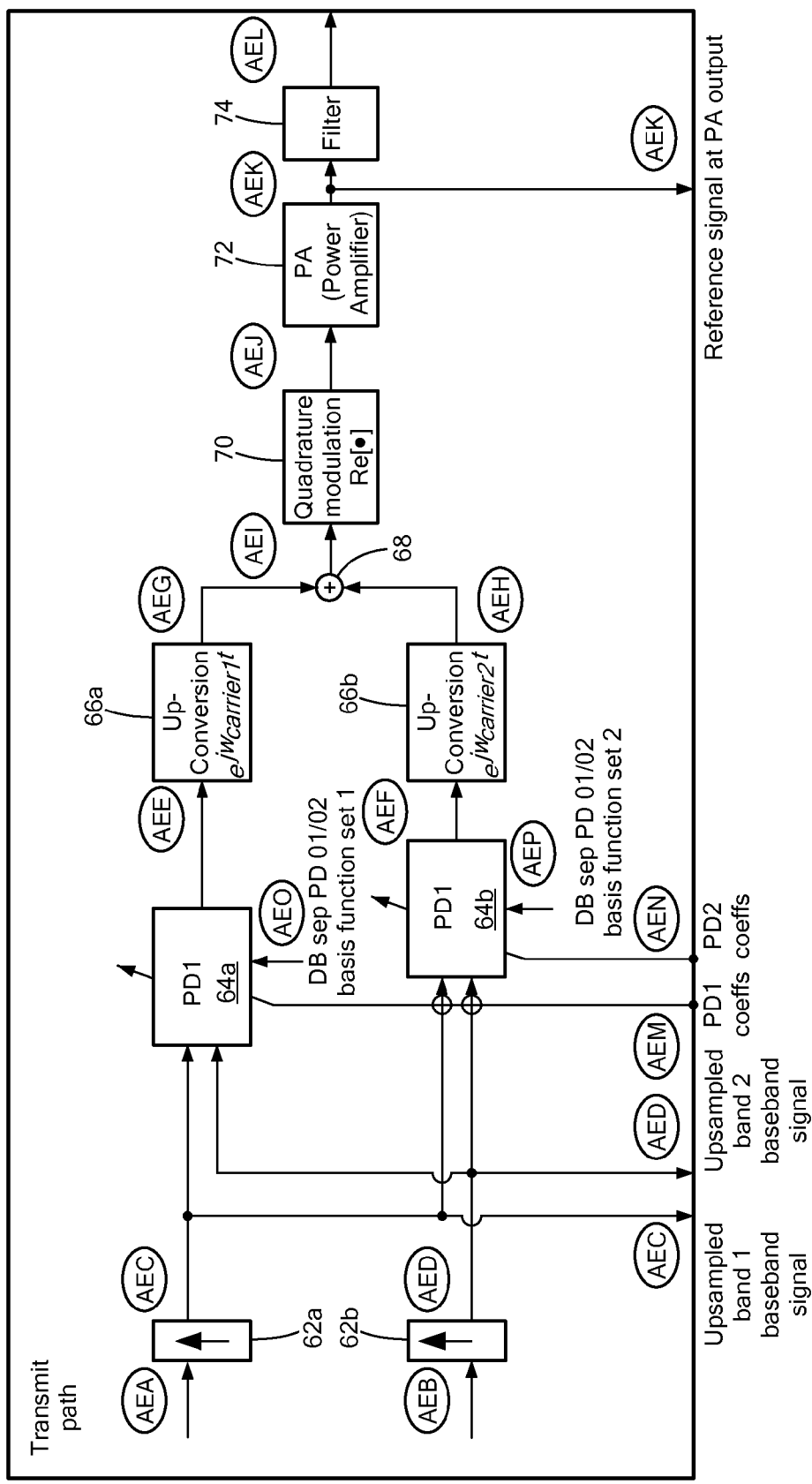
FIG. 5 is an exemplary block diagram of an dual band separate pre-distortion architecture constructed in accordance with principles of the present invention.

To better understand the operation of the dual-input dual pre-distorter architecture of FIG. 5, it is helpful to first consider the single band pre-distortion architecture 20 that is shown in FIG. 2. In FIG. 2, each oval label with letters designates a signal at a particular point in the architecture 20. For example, reference designator AAA denotes a first baseband signal having a frequency spectrum predominantly within a first band A. The reference designator AAB denotes a second baseband signal having a frequency predominantly within a second band B.

The first baseband signal is up-sampled by a first up-sampler 22a to produce a first up-sampled signal AAC denoted as:

$$s_{bb,band\text{-}A}(n) \quad (AA\text{-}01)$$

The second baseband signal is up-sampled by a second up-sampler 22b to produce a second up-sampled signal AAD denoted as:

$$s_{bb,band\text{-}B}(n) \quad (AA\text{-}02)$$

In equations AA-01 and AA-02, the subscript bb denotes baseband, the subscript A denotes band A and the subscript B denotes band B.

The first up-sampled baseband signal is tuned by a first tuner 24a to a first intermediate frequency to obtain a first tuned signal AAE obtained as follows:

$$s_{sb,if,band\text{-}A}(n) = s_{bb,band\text{-}B}(n) \cdot \exp(-j\pi f_{delta} n T_s) \quad (AA\text{-}03)$$

The second up-sampled baseband signal is tuned by a second tuner 24b to minus the first intermediate frequency to obtain a second tuned signal AAF obtained as follows:

$$s_{sb,if,band\text{-}B}(n) = s_{bb,band\text{-}B}(n) \cdot \exp(j\pi f_{delta} n T_s) \quad (AA\text{-}04)$$

In equations AA-03 and AA-04, the subscript sb denotes single band and the subscript "if" denotes an intermediate frequency, $f_{delta}$.

These signals are summed by an adder 26 to obtain an equivalent baseband signal AAG obtained as follows:

$$s_{sb,bb}(n) = s_{sb,if,band\text{-}A}(n) + s_{sb,if,band\text{-}B}(n) \quad (AA\text{-}05)$$

This signal is input to a pre-distorter 28 which pre-distorts the signal to produce a pre-distorted signal AAH as follows:

$$s_{sb,bb,pd}(n) = f_{pd}(s_{sb,bb}(n)) \quad (AA\text{-}06)$$

In equation AA-06, f is a pre-distortion function which will be defined below. The subscript pd of the signal AAH $s_{sb,bb,pd}(n)$ denotes that the signal is predistorted. The pre-distorter 28 also receives a set of pre-distortion coefficients AAN denoted as a vector $w_{sb,bb}(n)$ and a set of basis functions AAO denoted as a vector function $F_{sb,bf}(\cdot)$. The coefficients AAN and basis functions AAO will be described subsequently in this application. In particular, the basis functions dictate the structure of the pre-distorter, as will be explained subsequently.

Considering only third order non-linearities, the pre-distorted signal AAH $s_{sb,bb,pd}(n)$ has energy primarily in four frequency bands as follows:

$$s_{bb,pd,band-A}(n) \cdot \exp(-j\pi f_{delta} nT_s) \quad (AA-07)$$

$$s_{bb,pd,band-B}(n) \cdot \exp(-j\pi f_{delta} nT_s) \quad (AA-08)$$

$$s_{bb,pd,band-C}(n) \cdot \exp(-j\pi f_{delta} nT_s) \quad (AA-09)$$

$$s_{bb,pd,band-D}(n) \cdot \exp(-j\pi f_{delta} nT_s) \quad (AA-10)$$

In this application, the indexing of bands are in increasing absolute value of their center frequency, and negative then positive for bands that have the same absolute value of their center frequency. In the above example, in the frequency domain, from left to right, the bands are labeled by C, A, B, and D. Both alphabetical indexing and numerical indexing are used interchangeably in this document, that is, band A and band 1 refer to the same band, band B and band 2 refer to the same band, band C and band 3 refer to the same band, etc.'

It follows that the signal AAH can be expressed as:

$$s_{sb,bb,pd}(n) = s_{bb,pd,band-A}(n) \cdot \exp(-j\pi f_{delta} nT_s) + \quad (AA-11)$$
$$s_{bb,pd,band-B}(n) \cdot \exp(j\pi f_{delta} nT_s) +$$
$$s_{bb,pd,band-C}(n) \cdot \exp(-j3\pi f_{delta} nT_s) +$$
$$s_{bb,pd,band-D}(n) \cdot \exp(j3\pi f_{delta} nT_s)$$

The signal AAH may be input to a band pass filter 30, which filters out the portion of the signal AAH that is in the band C and that is in the band D to produce a new signal AAI as follows:

$$s_{sb,bb,pd,band-AB}(n) = s_{bb,pd,band-A}(n) \cdot \exp(-j\pi f_{delta} nT_s) + \quad (AA-12)$$
$$s_{bb,pd,band-B}(n) \cdot \exp(j\pi f_{delta} nT_s)$$

The subscript band-AB denotes that the signal exhibits energy primarily in band A and in band B.

The signal AAI is up-converted by an up-converter 32 to a carrier frequency $f_c$ to produce a signal AAJ as follows:

$$s_{sb,bb,pd,band-AB} \cdot \exp(j\pi f_c T_s)$$

The signal AAJ is input to a quadrature modulator 34 to produce a quadrature modulated signal AAK as follows:

$$s_{sb,rf,pd,band-AB}(n) = \text{Re}[s_{sb,bb,pd,band-AB} \cdot \exp(j2\pi f_c T_s)] \quad (AA-13)$$
$$= \text{Re}[s_{sb,bb,pd,band-AB}(n)]\cos(j2\pi f_c T_s) -$$
$$\text{Im}[s_{sb,bb,pd,band-AB}(n)]\sin(j2\pi f_c T_s)$$

The subscript "rf" denotes that the signal is a radio frequency (RF) signal centered at the carrier frequency. The signal AAK is input to the power amplifier 36 to produce an amplified RF signal AAL as follows:

$$G_{pa} \cdot s_{sb,rf,nl-pd}(n) = G_{pa} \cdot f_{nl}(s_{sb,rf,nl-pd,band-AB}(n)) \quad (AA-14)$$

where $G_{pa}$ is the gain of the power amplifier and $f_{nl}$ denotes the non-linear function of the power amplifier 36.

In the above equations, the following notations are used: $f_{c1}$ and $f_{c2}$ are the carrier frequencies of first band A and second band B, respectively; $bw_1$ and $bw_2$ are the bandwidths of the baseband signals for the first band A and the second band B, respectively; $f_{delta}=(f_{c2}-f_{c1})$ is the frequency span between the carrier frequencies of the two bands, A and B; $f_c=(f_{c2}+f_{c1})/2$ is the carrier frequency of a dual band signal that is considered as a single band wideband signal consisting of both bands A and B. The bandwidth of such a single band wideband signal is given by $f_{delta}+(bw_1+bw_2)/2$. Such a single band wideband signal is input to the power amplifier 36 in the single band pre-distortion architecture 20.

In blocks 24a and 24b of FIG. 2, the intermediate frequency for pre-distortion is chosen to be $f_{if-pd}=f_{delta}/2$. The bandwidth of the pre-distorted signal is 3 to 5 times the bandwidth of the single band wideband signal given by $f_{delta}+(bw_1+bw_2)/2$., when considering distortions of $3^{rd}$ and $5^{th}$ order. Accordingly, the pre-distorter 28 of architecture 20 should operate at a sample frequency of 3 to 5 times the bandwidth given by $f_{delta}+(bw_1+bw_2)/2$. Since $f_{delta}$ is much greater than $bw_1$ and $bw_2$, the sampling rate is at least $3f_{delta}$ or $5f_{delta}$, respectively.

It is noted that the intermediate frequency $f_{if-pd}$ may be chosen to be much less than half the frequency span $f_{delta}/2$ so that the sample rate of the signal in the pre-distorter need not be proportional to the frequency span $f_{delta}$. $2f_c$. In other words, it is desirable that the intermediate frequency in blocks 24a and 24b, as well as the sampling rate in the pre-distorter 28, are only functions of $bw_1$ and $bw_2$, and not a function of $f_{delta}$.

Once again considering only third order non-linearities, the signal AAL has energy in bands C and D as well as bands A and B. Thus, the signal AAL is filtered by a filter 38 to produce the output signal AAM as follows:

$$G_{pa} \cdot s_{sb,rf,nl-pd,band-AB}(n) \quad (AA-20)$$

where $$s_{sb,rf,nl-pd,band-AB}(n) = s_{sb,rf,nl-pd,band-A}(n) + s_{sb,rf,nl-pd,band-B}(n) \quad (AA-21)$$

Because of the pre-distortion applied to the signal by the pre-distorter 28 to compensate for the distortion introduced by the power amplifier 36, there is a substantially linear relationship between the signal AAG and the signal AAM.

Figure 3:
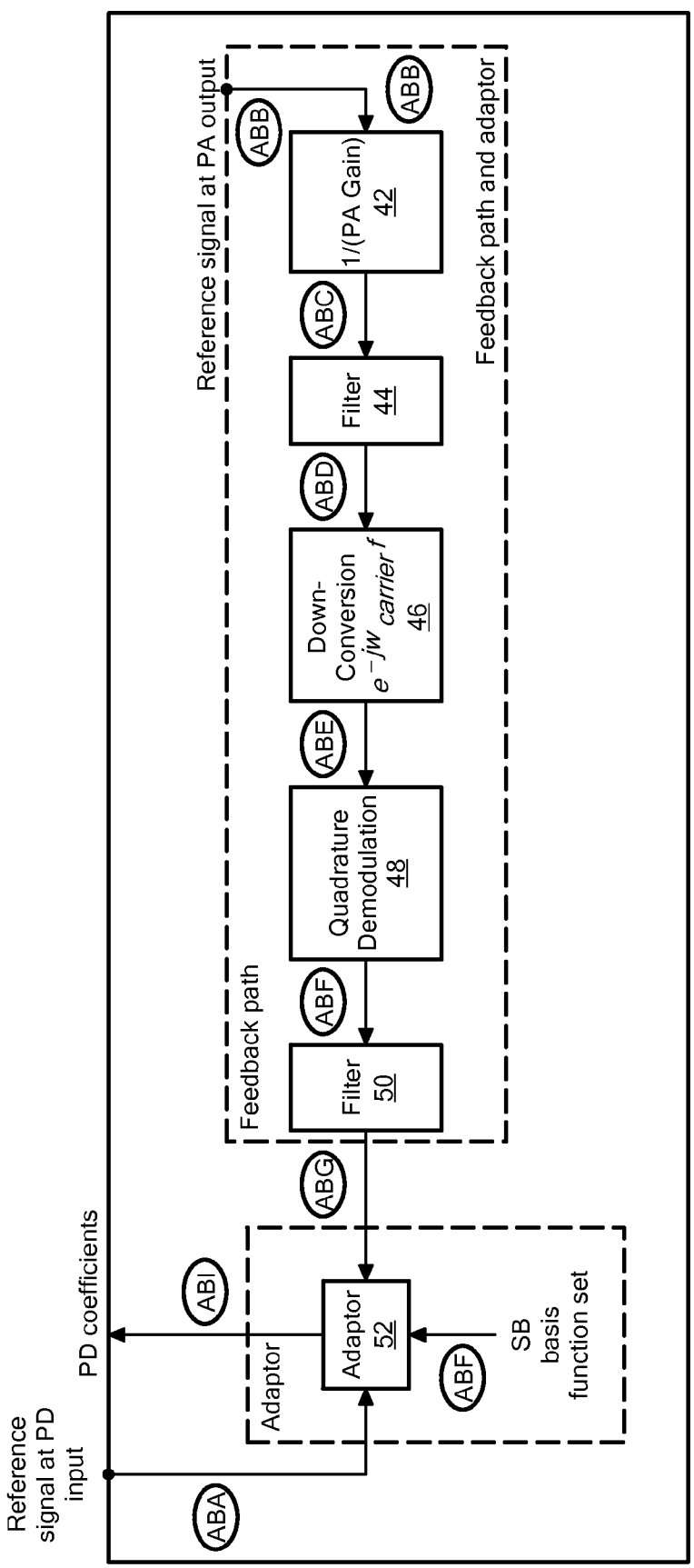
FIG. 3 is an exemplary block diagram of a pre-distortion modeler usable in conjunction with the wideband single band transmitter of FIG. 2.

FIG. 3 shows a pre-distorter modeler circuit 40 to be used in conjunction with the single band pre-distortion architecture 20. Circuit 40 receives two input signals labeled ABA and ABB. The input signal ABA is the same as the signal AAG given by equation AA-05, i.e., the input to the pre-distorter 28, repeated here for convenience:

$$s_{sb,bb}(n) \quad (AB-01)$$

The input signal ABB is the output signal AAL from the power amplifier 36 of FIG. 2 given by equation AA-20, repeated here for convenience:

$$G_{pa} \cdot s_{sb,rf,th-pd}(n)$$

The signal ABB is normalized by dividing by the Gain ($G_{pa}$) of the power amplifier 36 by a multiplier, amplifier or attenuator 42 to yield the signal ABC, expressed as:

$$s_{sb,rf,nl-pd}(n) \quad (AB-03)$$

Reference signal ABB is introduced for modeling purposes. In a real system, instead of a direct connection between AAL and ABB, an RF coupler is usually used to obtain ABB as an attenuated version of the power amplifier output AAL. Another attenuator is used to obtain the signal ABC. The signal ABC is input to a filter 44. Filter 44 filters the signal ABC to substantially filter out energy in the bands C and D to produce signal ABD as follows:

$$s_{sb,rf,nl-pd,band-AB}(n) \quad \text{(AB-04)}$$

This is the signal given by equation AA-21. The signal ABD is input to a down converter 46 which down converts by $-f_c$ to produce a baseband signal ABE given by:

$$s_{sb,rf,nl-pd,band-AB}(n) \cdot \exp(-j2\pi f_c) \quad \text{(AB-05)}$$

This signal has a baseband component centered at DC and an out-of-band component centered at $2f_c$, which can be expressed as:

$$s_{sb,rf,nl-pd,band-AB}(n) \cdot \exp(-j2\pi f_c) = \quad \text{(AB-06)}$$
$$s_{sb,bb,nl-pd,band-AB}(n) + s_{sb,rf-oob,nl-pd,band-AB}(n)$$

The signal ABE is quadrature-demodulated by a quadrature demodulator 48 to produce an intermediate signal ABF, which in turn is filtered by filter 50 to remove the out-of-band component centered at $2f_c$, to produce a signal ABG, which is the desired feedback signal given by:

$$s_{sb,bb,nl-pd,band-AB}(n) \quad \text{(AB-07)}$$

The signal ABG is input to the adaptor 52. The adaptor also receives the signal ABA given by AB-01 above:

$$S_{sb,bb}(n) \quad \text{(AB-01)}$$

The adaptor 52 further receives the basis function set ABH which are the same basis functions AAO $F_{sb,bf}(\bullet)$ given above as input to the pre-distorter 28. The output of the adapter 52 is the set of coefficients ABI which are the same coefficients AAN $w_{sb,bb}(n)$ given above as input to the pre-distorter 28.

Figure 4:
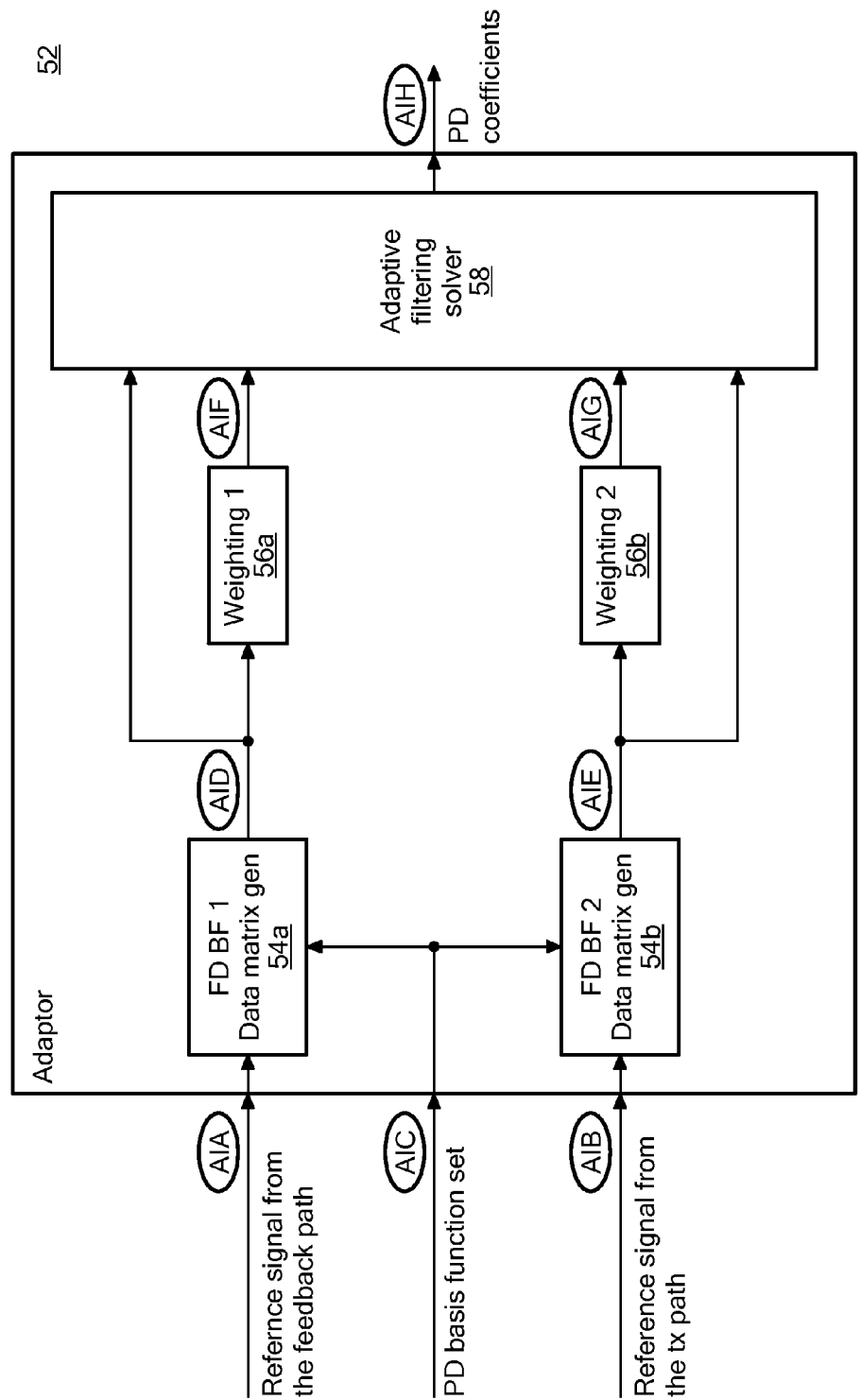
FIG. 4 is an exemplary block diagram of an adaptor for computing coefficients for a pre-distorter constructed in accordance with principles of the present invention.

FIG. 4 shows a more detailed view of the adaptor 52. As discussed above, the adaptor 52 has three inputs:

$$AIA=ABG=s(n) \quad \text{(AI-01)}$$

$$AIB=ABA=s'(n) \quad \text{(AI-02)}$$

$$AIC=ABH=F_{sb,bf} \quad \text{(AI-05)}$$

The reference signal s(n) is input to a first data matrix generator 54a to produce a first matrix AID given by:

$$A_i = [a(n_0), a(n_1), \ldots, a(n_{N-1})]^T \quad \text{(AI-06)}$$
where
$$a(n) = F_{bf}(s(n)) \quad \text{(AI-05)}$$
$$a(n) = [a_0(n), a_1(n), \ldots, a_{P-1}(n)]^T \quad \text{(AI-04)}$$
$$= [f_{bf,0}(s(n)), f_{bf,1}(s(n)), \ldots, f_{bf,P-1}(s(n))]^T$$

a(n) is a P×1 vector, superscript T denotes the transpose operation, and $A_i$ is an N×P matrix, and where $$a_p(n)=f_{bf,p}(n)) \quad \text{(AI-03)}$$

Matrix Ai is the responses of the basis function set to input s(n) over n=n0, n1, . . . , N–1, where N is the number of samples used for adaptation iteration i, and where i is the iteration index The reference signal s' (n) is input to a second data matrix generator 54b to produce a second matrix AIE given by:

$$A'_i=[a'(n_0),a'(n_1),\ldots,a'(n_{P-1})]^T \quad \text{(AI-07)}$$
where
$$a'(n)=F_{bf}(s'(n)) \quad \text{(AI-08)}$$

The signal AID of equation AI-06 is input to a first multiplier 56a which multiplies the signal AID by a set of weights, w, as follows:

$$A_i \cdot w_i = b_i = [b(n_0), b(n_1), \ldots, b(n_{N-1})]^T \quad \text{(AI-09)}$$
where
$$w_i=[w_{i,0}, w_{i,1}, \ldots, w_{i,P-1}]^T \quad \text{(AI-10)}$$

vector b is an N×1 vector, w is a P×1 vector, and the signal AIF is $$b(n)=\Sigma_{p=0}^{P-1}a_p(n)\cdot w_{i,p} \quad \text{(AI-11)}$$

The signal AIF b(n) is the weighted summation of the responses of the basis function set to the input s(n).

Similarly, the signal AIE of equation AI-07 is input to a second multiplier 56b which multiplies the signal AIE by the set weights, w, as follows:

$$A'_i \cdot w_i = b'_i = [b'(n_0), b'(n_1), \ldots, b'(n_{N-1})]^T \quad \text{(AI-12)}$$

where the signal MG is $$b'(n)=\Sigma_{p=0}^{P-1}a'_p(n)\cdot w_{i,p} \quad \text{(AI-13)}$$

The vector b'(n) is readily available from the transmit path of FIG. 2 as signal AAH, namely, the output of the pre-distorter 28. Thus, the blocks between MB and AIG may be omitted, with the signal MG being obtained from the pre-distorter 28.

The weights $w_{i+1}$ are calculated by an adaptive solver 58 by solving the following equation for $w_{i+1}$:

$$A_i \cdot w_{I+i}=b'_i \quad \text{(AI-14)}$$

The subscript in $w_{i+1}$ means iteration i+1. The output of the adaptive solver 58 is labeled AIH and is an input AAN to the pre-distorter 28. Methods for choosing the basis functions, F, are discussed below.

FIG. 5 is a block diagram of an exemplary embodiment of a dual band separate pre-distortion transmit circuit. The reference designator AEA denotes a first baseband signal having a frequency spectrum predominantly within a first band A. The reference designator AEB denotes a second baseband signal having a frequency spectrum predominantly within a second band B.

The first baseband signal is up-sampled by a first up-sampler 62a to produce a first up-sampled signal AEC denoted as:

$$s_{bb,band-A}(n) \quad \text{(AE-01)}$$

The second baseband signal is up-sampled by a second up-sampler 62b to produce a second up-sampled signal AED denoted as:

$$s_{bb,band-B}(n) \quad \text{(AE-02)}$$

The signals AEC and AED are both input to each of two pre-distorters, PD1, 64a, and PD2 64b. The pre-distorter 64a also receives as inputs, pre-distorter coefficients AEM and basis functions AEO. The pre-distorter 64b also receives as inputs, pre-distorter coefficients AEN and basis functions AEP.

The output of the pre-distorters 64a and 64b are signals AEE and AEF as follows: where AEE is given by:

$$s_{db\text{-}sep,bb,pd,band\text{-}A}(n)=f_{db\text{-}sep,pd,band\text{-}A}(S_{bb,band\text{-}A}(n), S_{bb,band\text{-}B}(n)) \quad \text{(AE-03)}$$

and where AEF is given by:

$$s_{db\text{-}sep,bb,pd,band\text{-}B}(n)=f_{db\text{-}sep,pd,band\text{-}B}(S_{bb,band\text{-}A}(n), S_{bb,band\text{-}B}(n)) \quad \text{(AE-04)}$$

The signals AEE and AEF given by equations AE-03 and AE-04, respectively, are the same as the signals of the first terms in equations AA-07 and AA-08, respectively. That is:

$$s_{db\text{-}sep,bb,pd,band\text{-}A}(n)=s_{bb,pd,band\text{-}A}(n) \quad \text{(AE-05)}$$

$$s_{db\text{-}sep,bb,pd,band\text{-}B}(n)=s_{bb,pd,band\text{-}B}(n) \quad \text{(AE-06)}$$

These signals are upconverted by upconverters 66a and 66b, respectively, to produce signals AEG and AEH centered at the carrier frequency, $f_c$. These signals are summed by an adder 68 to produce signal AEI. Signal AEI is quadrature-modulated by a quadrature modulator 70, which is similar to the quadrature modulator 34 of FIG. 2, to produce signal AEJ. Signal AEJ is the same as signal AAK given by equation AA-13. The signal AEJ is amplified (and distorted) by the power amplifier 72, which is similar to the power amplifier 36 of FIG. 2, to produce the distorted predistorted signal AEK. This signal is then filtered by a filter 74 which is similar to the filter 38 of FIG. 2.

Note that the inputs to the pre-distorters 64a and 64b are at baseband. This means that the pre-distorters may operate at a much lower sampling rate than would be required if the inputs were separated by $2f_{delta}$ or even by the smaller span $2f_{if}$.

Figure 6:
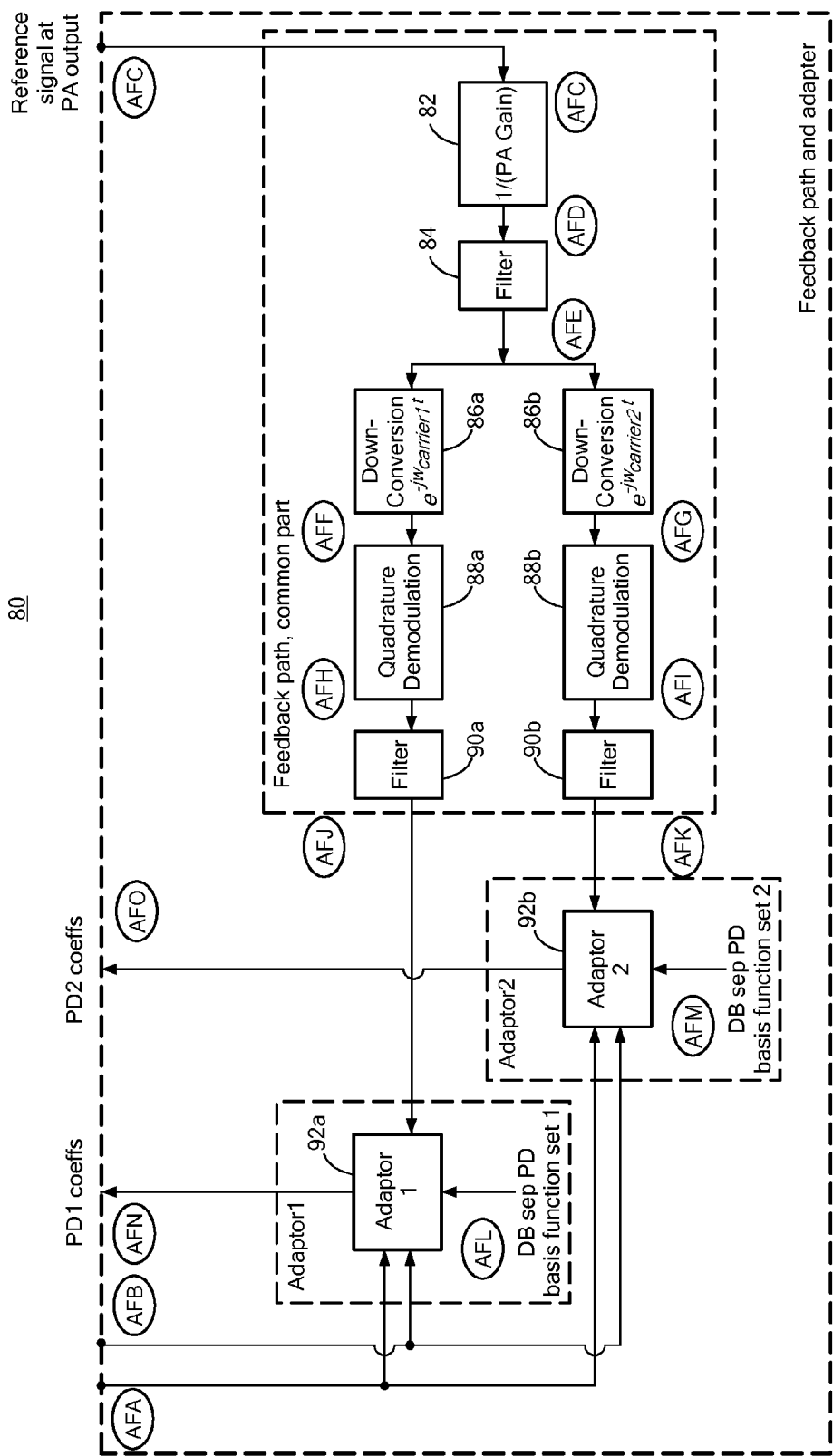
FIG. 6 is an exemplary block diagram of a pre-distortion modeler usable in conjunction with the architecture of FIG. 5.

FIG. 6 shows a dual band separate pre-distorter modeler circuit 80 used in conjunction with the dual band separate pre-distortion transmit circuit 60. Circuit 80 has three inputs, AFA, AFB and AFC. The input signal AFA is the signal AEC from FIG. 60. The input signal AFB is the signal AED from FIG. 60. The input signal AFC is the output signal AEK from the power amplifier 72 in FIG. 60.

The input signal AFC is normalized by the gain of the power amplifier 72 by a multiplier 82. The output of the multiplier 82 is labeled signal AFD and is input to a filter 84 to produce signal AFE. Signal AFE is split and sent to down-converters 86a and 86b to produce down-converted signals AFF and AFG. The down-converted signals AFF and AFG are demodulated by quadrature demodulators 88a and 88b, respectively, to produce demodulated signals AFH and AFI. These signals are filtered by filters 90a and 90b, respectively, to produce signals AFJ and AFK.

The signals AFJ and AFK are input to adaptors 92a and 92b, respectively. The adaptors 92a and 92b also receive both signals AFA and AFB. The operation of each of adaptors 92a and 92b is similar to the operation of the adaptor 52 of FIG. 4. Each adaptor 92a and 92b receives a set of basis functions for bands A and B, respectively, as follows:

$$F_{db\text{-}sep,bf,band\text{-}A}(\cdot,\cdot) \quad \text{(AE-18)}$$

$$F_{db\text{-}sep,bf,band\text{-}B}(\cdot,\cdot) \quad \text{(AE-19)}$$

Figure 7:
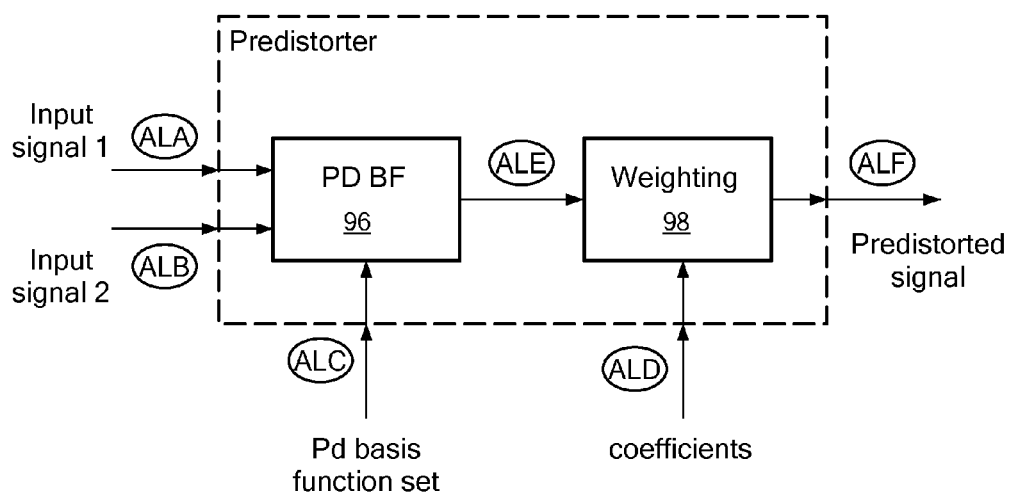
FIG. 7 is an exemplary block diagram of a two-input pre-distorter constructed in accordance with principles of the present invention.

Methods for choosing the basis functions, F, are discussed below. The adaptors 92a and 92b provide the coefficients AFN and AFO which are input signals AEM and AEN of the pre-distorters 64a and 64b, respectively, of FIG. 5. Note that the functions b (n) used in the adaptors 92a and 92b may be obtained from signal AEE and signal AEF of FIG. 5, respectively. FIG. 7 is a block diagram of a predistorter 94 with 2 inputs, such as the predisorters 64a and 64b. The input signals ALA and ALB are the input signals AEC and AED of FIG. 5. A basis function block 96 computes the following:

$$a_{bb}(n)=F_{bf}(s_{bb,band\text{-}A}(n),s_{bb,band\text{-}B}(n)) \quad \text{(AL-05)}$$

where the outputs $a_{bb}(n)$ are labeled ALE in FIG. 7. In (AL-05), $a_{bb}(n)$ is a (P by 1) vector, which are the responses of the basis function set to input $s_{bb}(n)$ and are defined as:

$$a_{bb}(n) = [a_{bb,0}(n), a_{bb,1}(n), \ldots, a_{bb,P-1}(n)]^T \quad \text{(AL-04)}$$
$$= [f_{bf,0}(s_{bb,band-A}(n), s_{bb,band-B}(n)),$$
$$f_{bf,1}(s_{bb,band-A}(n), s_{bb,band-B}(n)), \ldots,$$
$$f_{bf,P-1}(s_{bb,band-A}(n), s_{bb,band-B}(n))]^T$$

where superscript 'T' denotes transpose, and $a_{bb,p}(n)$ denote the response of the basis function p with input s(n):

$$a_{bb,p}(n)=f_{bf,p}(s_{bb,band\text{-}A}(n),s_{bb,band\text{-}B}(n)) \quad \text{(AL-03)}$$

Where $f_{bf,p}(\cdot)$ denote the basis function p, where p is an index of the basis function in the basis function set, and p=0, 1, ..., P–1. In (AL-05), the symbolic function $F_{bf}(\cdot)$, denotes the basis function set and is the input at ALC. For the first adaptor, ALC is from AFL in block 92a in FIG. 6, and the same as AEO in block 64a in FIG. 5 of predistorter 1. For the second adaptor, ALC is from AFM in block 92b in FIG. 6, and is the same as AEP in block 64b in FIG. 5 of predistorter 2.

The functions f are received from one of the two adaptors of FIG. 6, such as adaptor 92a. Also received from the adaptor 92a are coefficients w, labeled ALD:

$$w=[w_0, w_1, \ldots, w_{P-1}]^T \quad \text{(AL-06)}$$

The coefficients w are input to a multiplier 98 to multiply the coefficients w with the signal ALE to produce the pre-distorted signal ALF, which corresponds to the output AEE or AEF of pre-distorters 64a or 64b, respectively, of FIG. 5:

$$b_{bb}(n)=\Sigma_{p=0}^{P-1} a_{bb}(n)_p \cdot w_p = a_{bb}(n)^T \cdot w_i \quad \text{(AL-07)}$$

Note that the weighting vector of coefficients w is quasi-static because the weights need not be updated every sampling period, but can be updated less often.

The basis functions f for the dual band separate transmit circuit of FIG. 5 (signals AEO and AEN) may be chosen based on the structure for the single band transmit circuit of FIG. 2. Consider the power basis function case. First, the response of the $p^{th}$ basis function, $f_{db\text{-}sep\text{-}power\text{-}bf,bb,band\text{-}A,p}$, to the inputs $s_{sb,bb,band\text{-}A}(n)$ and $s_{sb,bb,band\text{-}B}(n)$ is as follows:

$$a_{db\text{-}sep\text{-}power\text{-}bf,bb,band\text{-}A,p}(n)=f_{db\text{-}sep\text{-}power\text{-}bf,bb,band\text{-}A,p}$$
$$(s_{sb,bb,band\text{-}A}(n),s_{sb,bb,band\text{-}B}(n)) \quad \text{(AE-31)}$$

where equation AE-31 corresponds to equation AL-03 above. The subscripts, db-sep-power-bf, denotes that the function is for the dual band separate pre-distorter architecture, and the subscript band-A, indicates that this is the pre-distortion function for the first pre-distorter 64a. The output of the pre-distorter 64a is given by:

$$s_{db\text{-}sep\text{-}power\text{-}bf,bb,pd,band\text{-}A}(n)=a_{db\text{-}sep\text{-}power\text{-}bf,bb,band\text{-}A}$$
$$(n)^T \cdot w_{db\text{-}sep\text{-}power\text{-}bf,bb,band\text{-}A} \quad \text{(AE-33)}$$

In (AE-33), the ($P_{db\text{-}sep\text{-}power\text{-}bf,bb,band\text{-}A}$ by 1) vector $a_{db\text{-}sep\text{-}power\text{-}bf,bb,band\text{-}A}(n)$ are the responses of the basis function set to inputs $S_{sb,bb,band\text{-}A}(n)$ and $S_{sb,bb,band\text{-}B}(n)$. The collection of (AE-31), with p=0, 1, ..., $P_{db\text{-}sep\text{-}power\text{-}bf,bb,band\text{-}A}-1$ can be concisely represented as $$a_{db\text{-}sep\text{-}power\text{-}bf,bb,band\text{-}A}(n)=F_{db\text{-}sep\text{-}power\text{-}bf,bb,band\text{-}A}$$
$$(s_{sb,bb,band\text{-}A}(n),s_{sb,bb,band\text{-}B}(n)) \quad \text{(AE-32)}$$

where the symbolic function $F_{db\text{-}sep\text{-}power\text{-}bf,bb,band\text{-}A}(\cdot)$ in (AE-32) represents the power basis function set in the single band predistorter. In (AE-33), the weighting vector $w_{db\text{-}sep\text{-}power\text{-}bf,bb,band\text{-}A}$ is of size ($P_{db\text{-}sep\text{-}power\text{-}bf,bb,band\text{-}A}$ by 1), corresponding to the weighting vector defined in (AL-06). The predistorter structure defined by $f_{db\text{-}sep\text{-}power\text{-}bf,bb,band\text{-}A}(\cdot)$, (AE-33) can be rewritten as $$s_{db\text{-}sep\text{-}power\text{-}bf,bb,pd,band\text{-}A}(n) = f_{db\text{-}sep\text{-}power\text{-}bf,bb,band\text{-}A}(s_{sb,bb,band\text{-}A}(n), s_{sb,bb,band\text{-}B}(n)) \quad \text{(AE-34)}$$

where (AE-34) is (AE-03) rewritten with the subscript of the symbol $f_{db\text{-}sep\text{-}power\text{-}bf,bb,band\text{-}A}(\cdot,\cdot)$ explicitly representing the predistorter structure. Equation (AE-33) corresponds to (AL-07). It is important to emphasize the equivalence of the left hand side of both (AE-33) and (AL-07), despite the difference in the symbol used. First, the symbol 'b' on the left hand side of (AL-07) comes from the context of the illustration of the adaptation algorithm shown in the (AI) set of equations. Second, the symbol 's' on the left hand side of (AE-33) comes from the context of the block diagrams walking through the signal processing on the datapath and 's' denotes generally 'signal', and the meaning of the signal is indicated by its subscript.

The counterpart of (AE-31) to (AE-36) for predistorter 2 are as follow:

$$a_{db\text{-}sep\text{-}power\text{-}bf,bb,band\text{-}B,p}(n) = f_{db\text{-}sep\text{-}power\text{-}bf,bb,band\text{-}A,p}(s_{sb,bb,band\text{-}A}(n), s_{sb,bb,band\text{-}B}(n)) \quad \text{(AE-31a)}$$

$$a_{db\text{-}sep\text{-}power\text{-}bf,bb,band\text{-}B}(n) = F_{db\text{-}sep\text{-}power\text{-}bf,bb,band\text{-}B}(s_{sb,bb,band\text{-}A}(n), s_{sb,bb,band\text{-}B}(n)) \quad \text{(AE-32a)}$$

$$s_{db\text{-}sep\text{-}power\text{-}bf,bb,pd,band\text{-}B}(n) = a_{db\text{-}sep\text{-}power\text{-}bf,bb,band\text{-}B}(n)^T \cdot w_{db\text{-}sep\text{-}power\text{-}bf,bb,band\text{-}B} \quad \text{(AE-33 a)}$$

$$s_{db\text{-}sep\text{-}power\text{-}bf,bb,pd,band\text{-}B}(n) = f_{db\text{-}sep\text{-}power\text{-}bf,\ bb,band\text{-}B}(s_{sb,bb,band\text{-}A}(n), s_{sb,bb,band\text{-}B}(n)) \quad \text{(AE-34a)}$$

$$a_{db\text{-}sep\text{-}power\text{-}bf,bb,band\text{-}B,p}(n) = a_{sb\text{-}power\text{-}bf,bb,band\text{-}B,p}(n) \quad \text{(AE-35a)}$$

$$a_{sb\text{-}power\text{-}bf,bb,band\text{-}B,p}(n) = \Sigma_{i=0}^{Ip} c_{db\text{-}sep\text{-}power\text{-}bf,bb,band\text{-}B,p,i} f_{db\text{-}sep\text{-}power\text{-}bf,bb,band\text{-}B,p,i}(s_{sb,bb,band\text{-}A}(n), s_{sb,bb,band\text{-}B}(n)) \quad \text{(AE-36a)}$$

From (AA-11), (AE-05), and (AE-31)-(AE-34) it is evident that the pre-distortion basis functions may be chosen such that the following holds true:

$$a_{db\text{-}sep\text{-}power\text{-}bf,bb,band\text{-}A,p}(n) = a_{sb\text{-}power\text{-}bf,bb,band\text{-}A,p}(n) \quad \text{(AE-35)}$$

where $a_{sb\text{-}power\text{-}bf,bb,band\text{-}A,p}(n)$ is the response of the conceptual power basis function to inputs $s_{sb,bb,band\text{-}A}(n)$, $s_{sb,bb,band\text{-}B}(n)$. Collectively, $a_{sb\text{-}power\text{-}bf,bb,band\text{-}A}(n) = [a_{sb\text{-}power\text{-}bf,bb,band\text{-}A,0}(n), a_{sb\text{-}power\text{-}bf,bb,band\text{-}A,1}(n), \ldots, a_{sb\text{-}power\text{-}bf,bb,band\text{-}A,P-1}(n)]^T$ span signal $s_{bb,pd,band\text{-}A}(n)$, which is the first term in (AA-07). $S_{bb,pd,band\text{-}A}(n)$ is the signal representing the baseband equivalent of the frequency components in band A of the predistorted signal AAH. $S_{sb,bb,pd}(n)$. The term $a_{db\text{-}sep\text{-}power\text{-}bf,bb,band\text{-}A,p}(n)$ is the response of the dual band power basis function to the input signal to the predistorter 64a of FIG. 5. Equating (AE-34) and (AE-05), the design goal is explicitly shown. The goal is to achieve the condition that the predistorted signal obtained by the dual band separate predistorter is identical to the baseband equivalent of the frequency components in band A of the predistorted signal generated in the single band predistortion architecture when the dual band signal is treated as a single band wide band signal. The equation (AE-35) implies that the constructed dual band power basis functions must be able to span the same space that spans the baseband equivalent of the frequency components in band A of the predistorted signal generated in the single band predistortion architecture.

In an alternative expression, the power basis function set $F_{db\text{-}sep\text{-}power\text{-}bf,bb,band\text{-}A}(\cdot)$ for the dual band separate transmit circuit may be constructed such that the following holds true:

$$a_{sb\text{-}power\text{-}bf,bb,band\text{-}A,p}(n) = \Sigma_{i=0}^{I} c_{p,i} a_{db\text{-}sep\text{-}power\text{-}bf,bb,band\text{-}A,i}(n) \quad \text{(AE-36)}$$

where $I = P_{db\text{-}sep\text{-}power\text{-}bf,bb,band\text{-}A}$, and $c_{db\text{-}sep\text{-}power\text{-}bf,bb,band\text{-}A,p,i}$ is a constant that may be obtained by computer simulation or by calculation, as described below. Equation (AE-36) specifies the condition that the collection of the constructed basis function set spans the space of the desired signal. It is not necessarily a one-to-one correspondence as specified by equation (AE-35).

For third order non-linear terms the power basis function that satisfies equation AE-35 is as follows:

$$f_{1b\text{-}sep\text{-}power\text{-}bf,bb,band\text{-}A,2}(s_1, s_2) = s_1 |s_1|^2 + 2 s_1 |s_2|^2 \quad \text{(AE-61)}$$

For $5^{th}$ order non-linear terms, the power basis function that satisfies equation AE-35 is as follows:

$$f_{db\text{-}sep\text{-}power\text{-}bf,bb,band\text{-}A,4}(s_1, s_2) = \quad \text{(AE-67)}$$
$$s_1 |s_2|^4 + 6 s_1 |s_1|^2 |s_2|^2 + 3 s_1 |s_2|^4$$

For non linear terms of order (2k+1) the basis functions that satisfy equation AE-35 are as follows:

$$f_{db\text{-}sep\text{-}power\text{-}bf,bb,band\text{-}A,2k}(s_1, s_2) = \Sigma_{i=0}^{k+1} c_{db\text{-}sep\text{-}power\text{-}bf,bb,band\text{-}A,2k,i} f_{db\text{-}sep\text{-}power\text{-}bf,bb,band\text{-}A,2k,i}(s_1, s_2) \quad \text{(AE-72)}$$

where $f_{db\text{-}sep\text{-}power\text{-}bf,bb,band\text{-}A,2k,i}(s_1, s_2)$ is defined as:

$$f_{db\text{-}sep\text{-}power\text{-}bf,bb,band\text{-}A,2k,i}(s_1, s_2) = s_1 |s_1|^{2(k-i+1)} |s_2|^{2(i-1)} \quad \text{(AE-73)}$$

In (AE-72) and (AE-73), the index i is the index of the basis function which is the same as the index p in (AL-03), for example. In equation AE-72, the value of the constant terms $C_{db\text{-}sep\text{-}power\text{-}bf,bb,band\text{-}A,2k,i}$ for k=3, 4, 5, 6 are obtained from computer simulations and summarized in the following table.

| $C_{db\text{-}sep\text{-}power\text{-}bf,bb,band\text{-}A,2k,i}$ | k = 1 | k = 2 | k = 3 | k = 4 | k = 5 | k = 6 |
|---|---|---|---|---|---|---|
| i = 1 | 1 | 1 | 1 | 1 | 1 | 1 |
| i = 2 | 2 | 6 | 12 | 20 | 30 | 42 |
| i = 3 |   | 3 | 18 | 60 | 150 | 315 |
| i = 4 |   |   | 4 | 40 | 200 | 700 |
| i = 5 |   |   |   | 5 | 75 | 525 |
| i = 6 |   |   |   |   | 6 | 126 |
| i = 7 |   |   |   |   |   | 7 |

In the alternative to obtaining the coefficients by computer simulation, the coefficients may be calculated. First, the expression on the right hand side of equation (AE-73) may be factored as follows:

$$f_{db\text{-}sep\text{-}power\text{-}bf,bb,band\text{-}A,2k,i}(s_1, s_2) = s_1 (s_1 \cdot s_1^*)^{(k-i+1)} (s_2 \cdot s_2^*)^{(i-1)} \quad \text{(AE-74)}$$
$$= s_1^{(k-i+2)} \cdot (s_1^*)^{(k-i+1)} \cdot s_2^{(i-1)} \cdot (s_2^*)^{(i-1)}$$

Then the coefficient $C_{db\text{-}sep\text{-}power\text{-}bf,bb,band\text{-}A,2k,i}$ is the coefficient for the term expressed in equation AE-74 normalized by the coefficient for the term $s_1^{(k+1)} \cdot (s_1^*)^k$, which is (AE-74) with i=1, in the expansion of $(s_1 + s_1^* + s_2 + s_2^*)^{(2k+1)}$. It follows that:

$$c_{db-sep-power-bf,bb,band-A,2k,i} = C(2*k+1, k-i+2) \cdot \quad \text{(AE-75)}$$
$$C(k+i-1, k-i+1) \cdot C(2*i-2, i-1)/C(2*k+1, k+1)$$

where, C (n, k) is the 'n choose k' function. Note that when targeting non-linearities of 2k+1, there will be 2k basis functions and 2k coefficients, where there are k basis functions and k coefficients per pre-distorter.

For pre-distorter 64b (B band) the basis functions are as follows:

$$f_{db-sep-power-bf,bb,band-B,2k,i}(s_1,s_2) = f_{db-sep-power-bf,bb,band-A,2k,i}(s_1,s_2) \quad \text{(AE-53)}$$

where $$s_1 = s_{sb,bb,band-B}(n)$$

$$s_2 = s_{sb,bb,band-A}(n)$$

are the inputs to the pre-distorter 64b. In other words, the basis functions for the first pre-distorter are the dual of the basis functions for the second pre-distorter, where the dual set is obtained by interchanging the roles of $s_1$ and $s_2$.

Equations (AE-72)-(AE-75) and (AE-53) summarize the basic form of the proposed dual band power basis function set. It can be directly applied to dual band separate architectures as the one shown in FIGS. 5-6. With this approach, when targeting odd order non-linearities of up to the (2k+1)-th order, there will be 2k basis functions and 2k coefficients, where there are k basis functions and k coefficients per pre-distorter. More specifically, the coefficients for predistorter 1 is the vector $w_{db-sep-power-bf,bb,band-A}$ in equation (AE-33). The vector $w_{db-sep-power-bf,bb,band-A}$ can be expressed in (AE-33) with P=k, as.

$$s_{db-sep-power-bf,bb,pd,band-A}(n) = a_{db-sep-power-bf,bb,band-A}(n)^T \cdot w_{db-sep-power-bf,bb,band-A} \quad \text{(AE-33)}$$

Two variations based on the power basis function sets expressed in Equations (AE-72)-(AE-75) are possible. The first variation results in a larger number of basis functions, therefore providing the predistortion system larger degrees of freedom to counteract the non-linearity at the expense of a larger number of coefficients that need to be evaluated by the evaluation process. The second variation results in a smaller number of basis functions, therefore requiring the evaluation of a smaller number of coefficients, at the expense of smaller degrees of freedom to counteract the non-linearity. These two variations represent two extremes in terms of the number of basis functions and coefficients. It is straightforward to extend and design an approach customized to a particular power amplifier system that achieves the best trade-off between flexibility, in terms of the number of degrees of freedoms versus the computational complexity in coefficient evaluation.

In the first approach, the power basis functions are further decomposed. For example, for $3^{rd}$ order non-linear terms for pre-distorter 64a (A band), the basis functions are as follows:

$$f_{db-sep-power-bf,bb,band-A,2,1}(s_1,s_2) = s_1|s_1|^2 \quad \text{(AE-41)}$$

$$f_{db-sep-power-bf,bb,band-A,2,2}(s_1,s_2) = s_1|s_2|^2 \quad \text{(AE-42)}$$

where $$s_1 = s_{sb,bb,band-A}(n)$$

$$s_2 = s_{sb,bb,band-B}(n)$$

For $5^{th}$ order non-linear terms, the basis functions are as follows:

$$f_{db-sep-power-bf,bb,band-A,4,1}(s_1,s_2) = s_1|s_1|^4 \quad \text{(AE-44)}$$

$$f_{db-sep-power-bf,bb,band-A,4,2}(s_1,s_2) = s_1|s_1|^2|s_2|^2 \quad \text{(AE-45)}$$

$$f_{db-sep-power-bf,bb,band-A,4,3}(s_1,s_2) = s_1|s_2|^4 \quad \text{(AE-46)}$$

For non-linear terms of order (2k+1), the basis functions are as follows:

$$f_{db-sep-power-bf,bb,band-A,2k,1}(s_1,s_2) = s_1|s_1|^{2k} \quad \text{(AE-48)}$$

$$f_{db-sep-power-bf,bb,band-A,2k,2}(s_1,s_2) = s_1|s_1|^{2(k-1)}|s_2|^2 \quad \text{(AE-49)}$$

...

$$f_{db-sep-power-bf,bb,band-A,2k,i}(s_1,s_2) = \quad \text{(AE-50)}$$
$$s_1|s_1|^{2(k-i+1)}|s_2|^{2(i-1)}$$

...

$$f_{db-sep-power-bf,bb,band-A,2k,k+1}(s_1,s_2) = s_1|s_2|^{2k} \quad \text{(AE-51)}$$

Note that in this first approach there are k(k+3) basis functions and k(k+3) coefficients: k(k+3)/2 basis functions for the first pre-distorter, k(k+3)/2 basis functions for the second pre-distorter, k(k+3)/coefficients for the first pre-distorter, and k(k+3)/2 coefficients for the second pre-distorter. One advantage of this approach is its flexibility. The basis function set provides k(k+3) degrees of freedom for decomposition of the desired pre-distortion and gives the maximum flexibility among variations based on the proposed dual band power basis function. This is especially useful when the characterization of the dual band power amplifier is not uniform across the pass bands. An advantage of this approach is that duality exists between the basis functions for each pre-distorter, as shown in equation (AE-53). Thus, time division multiplexing (TDM) can be applied to the relevant circuits, resulting in hardware savings. This is especially true in the feedback receive path, as the circuitry does not need to be on all the time for both bands: The relevant circuits to which TDM may be applied include:

1. The adaptor 92a and 92b;
2. The receive signal processing chain, including 88a, and 90a vs. 88b, and 90b;
3. The down converter 86a and 86b.

TDM can also be applied to the basis function output evaluation circuit among the predistorters 64a and 64b.

The second approach seeks to reduce the number of independent basis functions in the basis function set, and therefore reduce the number of coefficients. When using the basic form of the proposed dual band power basis function set summarized in (AE-72)-(AE-75) and (AE-53), in the architecture shown in FIG. 5, there are two sets of coefficients:

$$w_{db-sep-power-bf,bb,band-A} \text{ and}$$

$$w_{db-sep-power-bf,bb,band-B},$$

for the two predistorters 64a and 64b, respectively. Equation (AE-53) describes the duality between the basis functions for the two predistorters. In the second approach, the same set of coefficients are applied to both adaptors, that is:

$$w_{db-sep-power-bf,bb,band-A} = w_{db-sep-power-bf,bb,band-B} \quad \text{(AE-76)}$$

Equation (AE-76) applies to (AE-33) and (AE-33a). This results in an architecture based on a two-input two-output predistorter structure.

Figure 8:
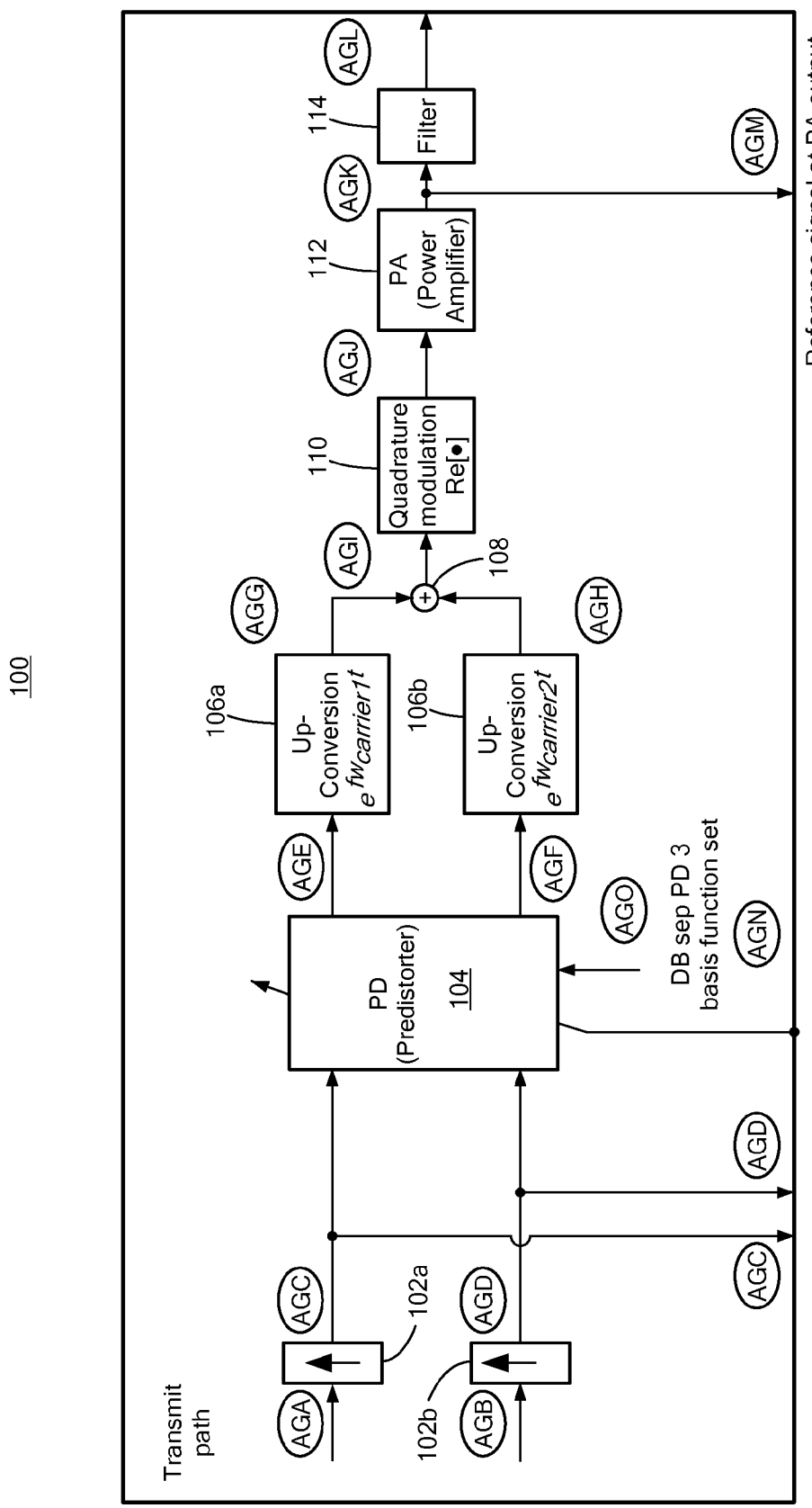
FIG. 8 is an exemplary block diagram of a dual band separate pre-distortion architecture with a shared pre-distortion circuit constructed in accordance with the present invention.

FIG. 8 shows a dual band separate pre-distortion transmit circuit 100. Circuit 100 is similar to circuit 60 of FIG. 5, except that FIG. 8 shows a single pre-distorter 104. Thus, the signals AGA and AGB in FIG. 8 correspond to signals AEA and AEB of FIG. 5, respectively. Up-samplers 102a and 102b of FIG. 8 correspond to up-samplers 62a and 62b of FIG. 5, respectively. Likewise, signals AGC and AGD correspond to signals AEC and AED, respectively.

The basis function set AGO input to the pre-distorter 104 is the basis function set from equation AE-50, which satisfy equation AE-53. Coefficients AGN are based on the basis function set AGO. Thus, the basis function set of equation AE-50 and its dual may be applied separately in the same pre-distorter to the two signals AGC and AGD to separately produce pre-distorted signal AGE for the A band and pre-distorted signal AGH for the B band.

For the remaining elements of FIG. 8, there is a one to one correspondence to the remaining elements of FIG. 5. Thus, signal AEE and AEF correspond to signals AGE and AGF, respectively. Adder 108 corresponds to adder 68. Signal AGI corresponds to signal AEI. Modulator 110 corresponds to modulator 70. Signal AGJ corresponds to signal AEJ. Power amplifier 112 corresponds to power amplifier 72. Signal AGK corresponds to signal AEK. Filter 114 corresponds to filter 74. Similarly, signal AGL corresponds to signal AEL.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A dual band pre-distortion method, comprising:
   obtaining a first signal, $S_1$, having energy substantially in a first band A;
   obtaining a second signal, $S_2$, having energy substantially in a second band B;
   pre-distorting a combination of the first signal and the second signal according to a first set of basis functions to produce a first pre-distorted signal, the first set of basis functions being chosen to produce a first combination of powers of the first signal and the second signal; and
   pre-distorting the combination of the first signal and the second signal according to a second set of basis functions to produce a second pre-distorted signal, the second set of basis functions being chosen to produce a second combination of powers of the first signal and the second signal.

2. The method of claim 1, wherein the first combination of powers of the first signal and the second signal, for (2k+1) order non-linearities, is:

$$\Sigma_{i=0}^{k+1} C_{1,2k,i} [S_1 |S_1|^{2(k-i+1)} |S_2|^{2(i-1)}]$$

where $C_{1,2k,i}$ is a constant for the $i^{th}$ term of the basis function of order 2k+1 for the first pre-distortion circuit.

3. The method of claim 2, wherein the constants $C_{1,2k,i}$ are given by:

$$C_{1,2k,i} = C(2^*k+1, k-i+2) \cdot C(k+i-1, k-i+1) \cdot C(2^*i-2, i-1) / C(2^*k+1, k+1)$$

where C (n, k) is the combinatorial "n choose k" function.

4. The method of claim 1, wherein the first combination of powers of the first signal and the second signal, for $3^{rd}$ order non-linearities, is:

$$S_1 |S_1|^2 + 2S_1 |S_2|^2.$$

5. The method of claim 1, wherein the first combination of powers of the first signal and the second signal, for $5^{th}$ order non-linearities, is:

$$S_1 |S_2|^4 + 6S_1 |S_1|^2 |S_2|^2 + 3S_1 |S_2|^4.$$

6. The method of claim 1, wherein pre-distorting the first signal is further based on a set of weights updated less often than a sampling frequency by which the first signal is sampled.

7. The method of claim 1, wherein the first combination of powers of the first signal and the second signal, for the $i^{th}$ term in the kth basis function for counteracting up to (2k+1) order non-linearities, is:

$$S_1 |S_1|^{2(k-i+1)} |S_2|^{2(i-1)}.$$

8. The method of claim 7, wherein the second combination of powers of the first signal and the second signal, for the $i^{th}$ term in the kth basis function, for counteracting up to (2k+1) order non-linearities, is:

$$S_2 |S_2|^{2(k-i+1)} |S_1|^{2(i-1)}.$$

9. The method of claim 8, further comprising using common pre-distortion circuitry to pre-distort the first signal at a first time according to the first combination of powers, and to pre-distort the second signal at a second time according to the second combination of powers.

10. A pre-distortion system, comprising:
    a first pre-distortion circuit pre-distorting a combination of a first signal $S_1$ and a second signal $S_2$ according to a first set of basis functions to produce a first output;
    a second pre-distortion circuit pre-distorting the combination of the first signal and the second signal according to a second set of basis functions to produce a second output, the second set of basis functions being a dual set of the first set of basis functions, the dual set being obtained by interchanging roles of the first signal and the second signal.

11. The pre-distortion system of claim 10, further comprising:
    a first up-converter up-converting the first output to produce a first up-converted signal;
    a second up-converter up-converting the second output to produce a second up-converted signal; and an adder, the adder summing the first up-converted signal with the second up-converted signal.

12. The pre-distortion system of claim 10, wherein the first set of basis functions is given by:

$$\Sigma_{i=0}^{k+1} C_{1,2k,i}[S_1|S_1|^{2(k-i+1)}|S_2|^{2(i-1)}]$$

where $C_{1,2k,i}$ is a constant for the $i^{th}$ term of the basis function of order k, and the second set of basis functions is given by:

$$\Sigma_{i=0}^{k+1} C_{1,2k,i}[S_2|S_2|^{2(k-i+1)}|S_1|^{2(i-1)}].$$

13. The pre-distortion system of claim 10, wherein the first set of basis function includes a term given by $$S_1|S_1|^{2(k-i+1)}|S_2|^{2(i-1)}$$

and where the second set of basis functions includes a term given by $$S_2|S_2|^{2(k-i+1)}|S_1|^{2(i-1)}$$

where 2k+1 is an order of a non-linearity and $i^{th}$ denotes an $i^{th}$ term in the k-th basis function of a set.

14. The pre-distortion system of claim 10, wherein a pre-distortion circuit receives a set of weights, $w=[w_0, w_1, \ldots, w_{P-1}]^T$, and computes $$b_{bb}(n) = \Sigma_{p=0}^{P-1} a_{bb,p}(n) \cdot w_p = a_{bb}(n)^T \cdot w$$

where $a_{bb,p}(n)$ is a response of a basis function to the first and second signals, and $b_{bb}(n)$ is an output of a pre-distortion circuit.

15. The pre-distortion system of claim 14, wherein the weights are computed at a rate substantially less than a sampling frequency by which the first or second signal is sampled.

16. The pre-distortion system of claim 14, wherein the weights are computed by an adaptive solver.

17. A method of pre-distorting a dual band signal to compensate for distortion of a power amplifier, the method comprising:

performing a pre-distortion operation on a first signal, $S_1$ in a band A at a first time according to a first set of basis functions by a first circuit; and performing the pre-distortion operation on a second signal $S_2$ in a band B at a second time according to a second set of basis functions by the first circuit, the first set of basis functions being the dual of the second set of basis functions.

18. The method of claim 17, wherein the first set of basis functions includes a term given by $$S_1|S_1|^{2(k-i+1)}|S_2|^{2(i-1)}$$

and where the second set of basis functions includes a term given by $$S_2|S_2|^{2(k-i+1)}|S_1|^{2(i-1)}$$

where 2k+1 is an order of a non-linearity and i denotes an $i^{th}$ term in the kth basis function of a set.

19. The method of claim 17, wherein the first set of basis functions is given by:

$$\Sigma_{i=0}^{k+1} C_{1,2k,i}[S_1|S_1|^{2(k-i+1)}|S_2|^{2(i-1)}]$$

where $C_{2,2k,i}$ is a constant for the $i^{th}$ term of the basis function of order 2k+1, and the second set of basis functions is given by:

$$\Sigma_{i=0}^{k+1} C_{1,2k,i}[S_2|S_2|^{2(k-i+1)}|S_1|^{2(i-1)}].$$

20. The method of claim 17, further comprising switching a first input and a second input of the first circuit between the first signal and the second signal.

* * * * *

UNITED STATES PATENT AND TRADEMARK OFFICE
CERTIFICATE OF CORRECTION

PATENT NO. : 8,520,773 B2  
APPLICATION NO. : 13/364019  
DATED : August 27, 2013  
INVENTOR(S) : Bai Page 1 of 4

It is certified that error appears in the above-identified patent and that said Letters Patent is hereby corrected as shown below:

In the Specification

In Column 4, Line 42, in Equation (AA-02), delete "$S_{bb\text{-}band\text{-}B}(n)$," and insert -- $S_{bb,band\text{-}B}(n)$ --, therefor.

In Column 4, Line 49, in Equation (AA-03), delete "$S_{sb,if,band\text{-}A}(n) - S_{bb,band\text{-}B}(n) \cdot \exp(-jnf_{delta}nT_s)$," and insert -- $S_{sb,if,band\text{-}A}(n) = S_{bb,band\text{-}B}(n) \cdot \exp(-jnf_{delta}nT_s)$ --, therefor.

In Column 4, Line 54, in Equation (AA-04), delete "$S_{sb,if,band\text{-}B}(n) - S_{bb,band\text{-}B}(n) \cdot \exp(-jnf_{delta}nT_s)$," and insert -- $S_{sb,if,band\text{-}B}(n) = S_{bb,band\text{-}B}(n) \cdot \exp(jnf_{delta}nT_s)$ --, therefor.

In Column 5, Line 16, in Equation (AA-09), delete "$S_{bb,pd,band\text{-}C}(n) \cdot \exp(-jnf_{delta}nT_s)$," and insert -- $S_{bb,pd,band\text{-}C}(n) \cdot \exp(-j3nf_{delta}nT_s)$ --, therefor.

In Column 5, Line 18, in Equation (AA-10), delete "$S_{bb,pd,band\text{-}D}(n) \cdot \exp(jnf_{delta}nT_s)$," and insert -- $S_{bb,pd,band\text{-}D}(n) \cdot \exp(j3nf_{delta}nT_s)$ --, therefor.

Signed and Sealed this  
Fifth Day of August, 2014

Michelle K. Lee  
*Deputy Director of the United States Patent and Trademark Office*

CERTIFICATE OF CORRECTION (continued)
U.S. Pat. No. 8,520,773 B2

In Column 5, Line 55, delete "$S_{sb,bb,pd,band-AB} \cdot \exp(j\pi f_c T_s)$"
and insert -- $S_{sb,bb,pd,band-AB} \cdot \exp(j2\pi f_c T_s)$ --, therefor.

In Column 7, Line 50, in Equation (AI-05), delete "$AIC = ABH = F_{sb,bf}$"
and insert -- $AIC = ABH = F_{sb,bf}(\cdot)$ --, therefor.

In Column 7, Line 67, in Equation (AI-03), delete "$a_p(n) = f_{bf,p}(n))$"
and insert -- $a_p(n) = f_{bf,p}(s(n))$ --, therefor.

In Column 8, Line 24, in Equation (AI-11), delete "$b(n) = \Sigma_{p=0}^{P-1} = a_p(n) \cdot w_{i,p}$"
and insert -- $b(n) = \Sigma_{p=0}^{P-1} a_p(n) \cdot w_{i,p}$ --, therefor.

In Column 8, Line 36, delete "MB" and insert -- AIB --, therefor.

In Column 8, Line 37, delete "MG" and insert -- AIG --, therefor.

In Column 8, Line 41, in Equation (AI-14), delete "$A_i \cdot w_{I+i} = b'_i$"
and insert -- $A_i \cdot w_{i+1} = b'_i$ --, therefor.

In Column 10, Lines 50-51, in Equation (AE-31), delete
"$a_{db-sep-power-bf,bb,band-A,p}(n) = f_{db-sep-power-bf,bb,band-A,p}(S_{sb,bb,band-A}(n), S_{sb,bb,band-B}(n)$"
and insert -- $a_{db-sep-power-bf,bb,band-A,p}(n) = f_{db-sep-power-bf,bb,band-A,p}(S_{sb,bb,band-A}(n), S_{sb,bb,band-B}(n))$ --, therefor.

In Column 11, Lines 26-27, in Equation (AE-31a), delete "$a_{db-sep-power-bfbb,band-B,p}(n) = f_{db-sep-power-bf,bb,band-A,p}(S_{sb,bb,band-A}(n), S_{sb,bb,band-B}(n))$"
and insert -- $a_{db-sep-power-bf,bb,band-B,p}(n) = f_{db-sep-power-bf,bb,band-A,p}(S_{sb,bb,band-A}(n), S_{sb,bb,band-B}(n))$ --, therefor.

CERTIFICATE OF CORRECTION (continued)
U.S. Pat. No. 8,520,773 B2

In Column 11, Lines 31-32, in Equation (AE-33a), delete " $db\text{-sep-power-bf,bb,pd,band-B}(n) = a_{db\text{-sep-power-bfbb,band-B}}(n)^T \cdot w_{db\text{-sep-power-bfbb,band-B}}$ ,"

and insert -- $db\text{-sep-power-bf,bb,pd,band-B}(n) = a_{db\text{-sep-power-bf,bb,band-B}}(n)^T \cdot w_{db\text{-sep-power-bf,bb,band-B}}$ --, therefor.

In Column 11, Line 36, in Equation (AE-35a), delete " $a_{db\text{-sep-power-bfbb,band-B},p}(n) = a_{sb\text{-power-bf,bb,band-B},p}(n)$ " and insert -- $a_{db\text{-sep-power-bf,bb,band-B},p}(n) = a_{sb\text{-power-bf,bb,band-B},p}(n)$ --, therefor.

In Column 11, Line 45, in Equation (AE-35), delete " $a_{db\text{-sep-power-bf,bb,band-A},p}(n) = a_{sb\text{-power-bf,bb,band-A},p}(n)$ " and insert -- $a_{db\text{-sep-power-bf,bb,band-A},p}(n) = a_{sb\text{-power-bf,bb,band-A},p}(n)$ --, therefor.

In Column 11, Line 46, delete " $a_{sb\text{-po wer-bf,bb,band-A},p}(n)$ ,"

and insert -- $a_{sb\text{-power-bf,bb,band-A},p}(n)$ --, therefor.

In Column 11, Line 49, delete " $[a_{sb\text{-power-bfbb,band-A},0}(n), a_{sb\text{-power-bfbb,band-A},1}(n),$ "

and insert -- $[a_{sb\text{-power-bf,bb,band-A},0}(n), a_{sb\text{-power-bf,bb,band-A},1}(n),$ --, therefor.

In Column 12, Line 8, delete " $C_{db\text{-sep-power-bf,bb,bb,band-A},p,i}$ "

and insert -- $C_{db\text{-sep-power-bf,bb,band-A},p,i}$ --, therefor.

In Column 12, Line 17, in Equation (AE-61), delete " $f_{lb\text{-sep-power-bf,bb,band-A},2}(s_1,s_2) = s_1|s_1|^2 + 2s_1|s_2|^2$ ," and insert -- $f_{db\text{-sep-power-bf,bb,band-A},2}(s_1,s_2) = s_1|s_1|^2 + 2s_1|s_2|^2$ --, therefor.

In Column 12, Line 66, delete " $(s_1+s_1+s_2+s_2^*)^{(2k+1)}$ ,"

and insert -- $(s_1+s_1^*+s_2+s_2^*)^{(2k+1)}$ --, therefor.

CERTIFICATE OF CORRECTION (continued)
U.S. Pat. No. 8,520,773 B2

In Column 13, Line 2, in Equation (AE-75), delete "$C(2*k+1, k-i+2)$," and insert --$= C(2*k+1, k-i+2)$--, therefor.

In Column 13, Line 3, in Equation (AE-75), delete "$C(2*i-2, i-1)/C(2*k+1, k+1)$" and insert --$C(2*i-2, i-1)/C(2*k+1, k+1)$--, therefor.

In Column 13, Line 13, in Equation (AE-53), delete "$f_{\text{db-sep-power-bfbb,band-B},2k,i}(s_1, s_2) = f_{\text{db-sep-power-bfbb,band-A},2k,i}(s_1, s_2)$," and insert --$f_{\text{db-sep-power-bf,bb,band-B},2k,i}(s_1, s_2) = f_{\text{db-sep-power-bf,bb,band-A},2k,i}(s_1, s_2)$--, therefor.

In Column 14, Line 6, in Equation (AE-45), delete "$f_{\text{db-sep-power-bff,bb,band-A},4,2}(s_1, s_2) = s_1|s_1|^2|s_2|^2$," and insert --$f_{\text{db-sep-power-bf,bb,band-A},4,2}(s_1, s_2) = s_1|s_1|^2|s_2|^2$--, therefor.

In the Claims

In Column 17, Line 18, in Claim 13, delete "$i^{th}$ denotes" and insert -- i denotes --, therefor.

In Column 18, Line 24, in Claim 19, delete "$\Sigma_{i=0}^{k+1} C_{1,2k,i}[s_1|s_1|^{2(k-i+1)}|s_2|^{2(i-1)}]$," and insert --$\Sigma_{i=0}^{k+1} C_{2,2k,i}[s_1|s_1|^{2(k-i+1)}|s_2|^{2(i-1)}]$--, therefor.

In Column 18, Line 29, in Claim 19, delete "$\Sigma_{i=0}^{k+1} C_{1,2k,i}[s_2|s_2|^{2(k-i+1)}|s_1|^{2(i-1)}]$," and insert --$\Sigma_{i=0}^{k+1} C_{2,2k,i}[s_2|s_2|^{2(k-i+1)}|s_1|^{2(i-1)}]$--, therefor.